No. 785,091.

Patented March 21, 1905.

UNITED STATES PATENT OFFICE.

GEORGE B. DUNBAR, OF DETROIT, MICHIGAN.

PLASTIC COMPOUND.

SPECIFICATION forming part of Letters Patent No. 785,091, dated March 21, 1905.

Application filed October 30, 1903. Serial No. 179,175.

*To all whom it may concern:*

Be it known that I, GEORGE B. DUNBAR, a citizen of the United States, residing at Detroit, county of Wayne, State of Michigan, have invented a certain new and useful Improvement in Plastic Compounds; and I declare the following to be a full, clear, and exact description of the invention, such as will enable others skilled in the art to which it pertains to make and use the same.

This invention relates to plastic compounds, and has for its object an improved compound intended for use in articles that are exposed to the weather in which durability and rigidity are required and which will receive and retain paint.

The compound, according to the formula of this invention, may be used for the handles of umbrellas and similar articles, for caps to pillars in building, for cornice-work, and in general in all places where ornamental articles are used that are not subjected to great strain or great compression.

In producing the compound I melt and liquefy resin, which may be the ordinary fine resin of commerce, or as a substitute therefor the ordinary tar of the pine-tree may be used, and in the melted resin stir and mix thoroughly litharge, shellac, Portland cement, and sand or brick-dust. These are used in about the proportion of resin, sixteen sixty-fourths; litharge, six sixty-fourths; shellac, two sixty-fourths; Portland cement, eight sixty-fourths, and either sand or brick-dust thirty-two sixty-fourths. In the melted mass is mixed a fiber, using a quantity about equal in bulk or fiber to the bulk of the mixture before mentioned. The fibers may be wood-pulp, cotton fiber, pulped paper, or any similar fibrous material. If a pigment is desired, any suitable quantity of dry powdery pigment is employed and added in sufficient quantities to produce the desired shade of color. After the mass has been thoroughly mixed it is preferably allowed to cool and stand in mass form for a short time. It may then be warmed or slightly reheated and pressed into any desired shape and is ready for use.

What I claim is—

1. A plastic compound having in combination, resin, litharge, shellac, Portland cement, and sand or its named substitute combined with a fibrous material, substantially as described.

2. A plastic compound having in combination, resin, litharge, shellac, Portland cement, and sand or its named substitute combined with a fibrous material, and with a pigment, substantially as described.

In testimony whereof I sign this specification in the presence of two witnesses.

GEORGE B. DUNBAR.

Witnesses:
 CHARLES F. BURTON,
 MAY E. KOTT.